June 3, 1941.     G. BRADSHAW     2,244,046
SCREW
Filed Dec. 3, 1938
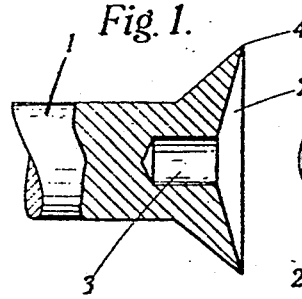
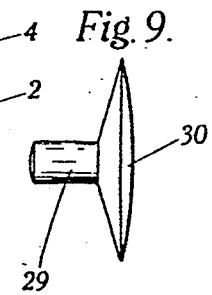
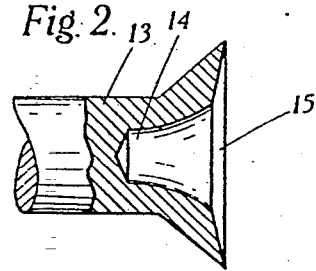
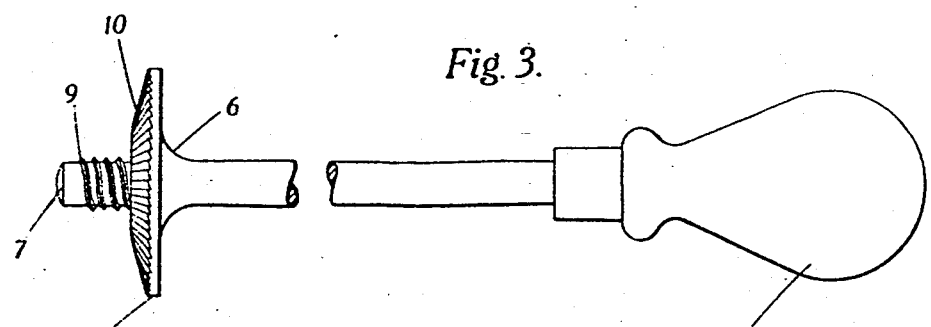
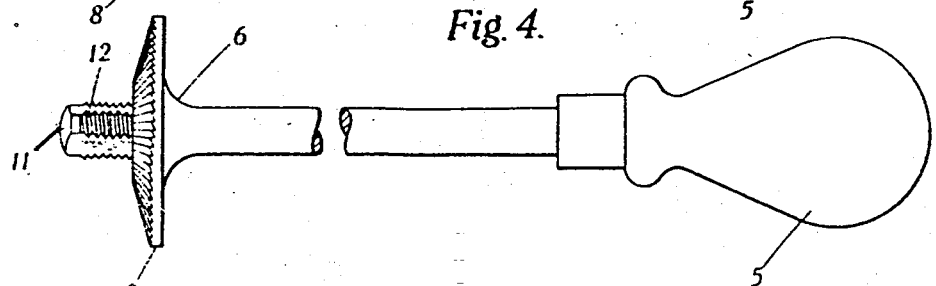
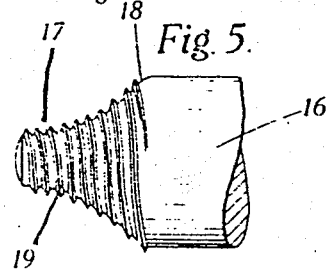
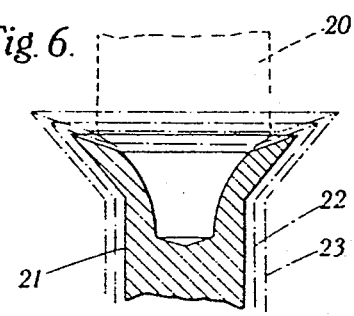
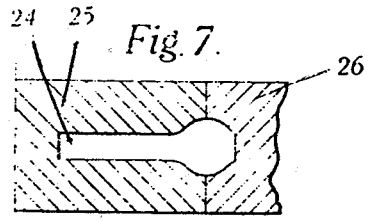
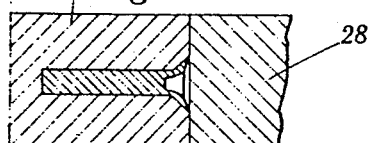
Inventor
G. BRADSHAW.
by
Attorneys Patented June 3, 1941

2,244,046

UNITED STATES PATENT OFFICE 2,244,046

SCREW

Granville Bradshaw, London, England, assignor to The Bradshaw Patent Screw Company (Foreign) Limited, London, England, a British company Application December 3, 1938, Serial No. 243,834
In Great Britain December 7, 1937

3 Claims. (Cl. 85—45)

The present invention relates to improvements in or relating to screws or the like and is applicable both to wood screws and screws for use in metal.

It is an object of the present invention to provide an improved screw which is, or can be, made substantially thief-proof and which is adapted, inter alia, for use in connection with fittings in railway carriages, bathrooms, lavatories or motor cars in order to prevent petty pilfering of such fittings.

It is a further object of the invention to provide an improved screw which can be screwed into position by means of a suitable tool by simply operating the tool, for example with one hand, without having to hold the screw.

It is a further object of the invention to provide an improved screw which is adapted for use with power-driven screw-driving devices.

It is a further object of the invention to provide an improved screw which, by means of a suitable plug, can be made of exceptionally neat or decorative appearance when in position.

It is another object of the invention to provide a screw which cannot be screwed or unscrewed with an ordinary screwdriver but which can be operated by means of a special tool.

It is a further object of the invention to provide a screw which is capable of simple and economical manufacture.

The present invention is based on the idea of providing a combined clutch coupling action and screw, helical or like coupling action between a screw and a screw-driving tool. Provision for such coupling action may be made by providing the head of the screw with a screw-threaded axial bore surrounded by an annular clutch surface and providing the screw-driving tool with an axial screw-threaded shank adapted to engage in the bore in the head of the screw and an annular clutch surface adapted to engage with the annular clutch surface on the head of the screw when the said shank is screwed into the bore in the head of the screw.

Such an arrangement is possessed of many advantages, but the operation of forming an internal thread in the bore of the head of the screw in the manufacture thereof represents a considerable item in the cost of production of the screw.

It has now been found that this disadvantage can be avoided by omitting the internal thread in the bore in the head of the screw and providing the screw-driving tool with a shank or nose having a self-tapping screw-thread, i. e. a screw-thread adapted to cut its own complementary internal thread in a recess in the head of the screw.

According to the present invention I provide a screw having a plain non-threaded axial recess of circular cross-section in the head, said recess being outwardly flared at its open end, the diameter of which open end is not less than the diameter of the shank of the screw adjacent to the head.

The periphery of the recess preferably coincides with the periphery of the head of the screw but it may be a short distance within it. Thus, for example, the screw may be provided with a recess comprising a truncated conical portion of wide cone angle in the centre of which is a non-threaded axial bore which may be cylindrical or of inwardly tapering form, i. e. truncated conical form. The angle of the cone defining the truncated conical portion should preferably be greater than 90°, advantageously about 140°–160° or even greater whilst the angle of the cone defining the bore (if the latter is conical) should not exceed about 14° and preferably should not exceed 13°.

The boundary between the said bore and the said truncated conical portion of the recess may be sharply defined or gradual. Again, the side walls of the recess may be continuously curved outwards from the closed end towards or up to the outer periphery and the generating line of the surface defined by the side walls may be an arc of a circle or any suitable curve such, for example, as a parabola, hyperbola or sine curve and the angle which the tangent to such curve makes with the axis of the screw may be, for example, 0° to 6° at the base of the recess and about 40° to 80° at the open end of the recess.

An important advantage of this latter construction is that the recess in the head of the screw can be formed by stamping, drop-forging, upsetting or the like at the same time as the head of the screw is formed and no drilling or other machining operations need necessarily be performed.

The formation of the recess and head is advantageously carried out in at least two stages in one of which an enlargement is formed from which to form the head in known manner per se whilst in a subsequent operation a head is formed with the recess therein by means of suitably shaped dies.

According to a further feature of the present invention there is provided a screw-driving tool suitable for use with a screw as above set forth. Such a tool may be a mechanically or manually operated one and comprises a head having a nose or shank and an enlarged base adapted to engage in a recess as above set forth in the head of a screw, said shank or nose and, if desired, the base being provided with a hardened external single or multiple continuous or interrupted self-tapping thread.

Various forms of nose or shank may be employed according to the shapes and sizes of the recesses in which they are intended to engage. Thus, for example, for use with screws having a plain cylindrical or slightly tapered bore in the head surrounded by an annular truncated conical portion, the screw-driving tool may have a substantially cylindrical or slightly tapered shank portion having a hardened external thread capable of cutting an internal thread, with a substantially truncated conical annular base portion adapted to come into clutch engagement with the annular truncated conical portion of the recess when the threaded shank is screwed into the bore. In this case the truncated conical base portion is advantageously provided with teeth, serrations or the like to assist the aforesaid clutch engagement and cause the latter to come into effect to transmit the torque necessary to turn the screw before the tool can become locked in the recess. These two portions may merge into one another in a curve.

For use with a modified form of screw as above set forth the said nose or shank may decrease in diameter from the base to the tip in a curve. For example, the generating line of the surface defined by the side walls of the nose or shank may be an arc of a circle or other curve and the angle which the tangent to such curve makes with the axis of the tool may be about 0° to 6° at or near the tip and about 40° to 80° or even more, up to 90° at the base. In the case of tools of this form, the screw-thread may extend any desired distance towards or even up to the periphery of the base. In such case it will not, as a rule, be necessary or desirable to provide teeth or serrations on the base portion.

In any case the actual tip of the nose or shank may be of any suitable shape, for example flat, more or less sharply tapered, pointed or rounded to facilitate insertion into the recess in the head of the screw. Similarly the base of the recess in the screw head may be of any suitable shape, for example flat, curved or pointed. The nose or shank should not extend quite to the base of the recess when the tool is in use.

The screw-thread on the shank or nose may be of any suitable self-tapping form but is preferably of a quick pitch in order to reduce the danger of binding or locking of the tool in the recess after the screw has been screwed into place and it is desired to remove the tool.

The exact shapes of the recesses in the screw heads and of the corresponding noses or shanks of the screw-driving tools are capable of variations, but in their design the following principles must be observed:

1. The recess must have a part of sufficient depth and of a sufficiently small taper (which may be zero) at the inner end that the screw can be sufficiently securely attached to the tool that it is not likely to become detached therefrom under the conditions of use until the tool is intentionally removed.

2. The recess and the nose or shank must be so shaped that co-operating surfaces come into engagement which not only serve to resist further axial movement of the nose or shank into the recess beyond a certain point but can serve to transmit a considerable torque without requiring great axial pressure and these engaging surfaces should engage over as large an area and at as great a distance from the axis as is practicable.

3. The forms of recess and nose or shank and the type of self-tapping thread must be such that the tool will not bind or lock in the screw when it is desired to remove the tool. In other words, the coupling between screw and tool must be capable of transmitting more torque in a screwing direction than in an unscrewing direction.

4. The recess must be so shaped and dimensioned as not unduly to weaken the head of the screw.

Suitable plugs adapted to be driven into the recesses in the screw heads may be provided and such plugs may entirely conceal the recess after the screw has been screwed into place. They may be suitably colored or otherwise made or finished to give a decorative effect. Such plugs may be made of any suitable material, for example synthetic resin, composition, Celluloid, wood, vulcanite or metal or of hard material such as hardened steel. The plugs are preferably so shaped, for example with a head and shank portion as to lie substantially flush with the head of the screw at the edge and may advantageously be flat or slightly convex. In such case if the plugs are of hard material a practically thief-proof effect is obtained since it will be extremely difficult to remove the plug by any ordinary tools. Where such plugs are to be used the recess must be so shaped as to be capable of retaining the plugs when the latter are driven in with a drive fit. The inner part of the recess must, therefore, possess a sufficient length of zero or very narrow taper (about 14° or preferably less) to achieve this end.

In order that the invention may be well understood preferred embodiments thereof will now be described by way of example only with reference to the accompanying drawing in which:

Figure 1 is an axial cross-section through a part including the head of one form of screw in accordance with the present invention, Figure 2 is a similar axial cross-sectional view in the case of a modified form of screw, Figure 3 is a side elevation of a form of screw-driving tool suitable for use with the screw of Figure 1, Figure 4 is a fragmentary side elevation of a modified form a screw-driving tool suitable for use with the screw of Figure 1, Figure 5 is a fragmentary side elevation of the head of a screw-driving tool suitable for use with the screw of Figure 2, Figure 6 is a diagrammatic view illustrating how the same screw-driving tool can be employed for screws of different sizes, Figure 7 is a diagrammatic view illustrating a stage in the manufacture of the screw of Figure 2, Figure 8 is a diagrammatic view illustrating a further stage of manufacture, Figure 9 is a side view of a plug which is suitable for insertion in the recess in the screw head after the screw has been screwed into position.

Referring to Figure 1 of the drawing, a wood screw 1 is provided in the head portion with a recess which, as will be seen, comprises a truncated conical portion 2 and a plain non-threaded cylindrical axial bore 3. It will be seen that the conical portion 2 extends to the periphery 4 of the head of the screw. The angle of the cone of the portion 2 is about 150°.

In order to screw such a screw into position use is made of a tool such as is illustrated in Figure 3 or one such as is illustrated in Figure 4. Referring to Figure 3, a screw-driving tool comprises a handle 5 and a head 6. The head 6 has a shank 7 and a base 8. The shank 7 is substantially cylindrical and is provided with a suitable hardened self-tapping thread 9 of quick pitch. The radial distance of the edge of the thread from the axis of the tool may increase slightly from the tip of the shank towards the base in order to facilitate the tapping in a manner known per se for self-tapping threads. The diameter of the shank 7 excluding the thread is preferably slightly less than the diameter of the bore 3 in order that when the shank 7 is screwed into the bore 3 there shall be some space to accommodate metal forced out of the threads cut in the bore by the thread 9. The base 8 has a substantially truncated conical surface 10 which, as diagrammatically shown, is provided with teeth or serrations. The angle of the cone corresponding to this surface is the same as that of the portion 2 of the recess in the head of the screw, say about 150°.

The dimensions of the shank 7 and bore 3 are such that the shank 7 can be pushed a certain distance into the bore and the screw will remain attached to the tool. The screw 1 may then be screwed into position for example into wood by simply manipulating the screw-driving tool. As the screw encounters resistance the shank 7 of the tool will turn in the bore 3 and owing to the provision of the self-tapping thread 9, an internal thread will be cut in the bore 3 and the surface 10 will be drawn into contact and then into firm clutch-engagement with the conical portion 2 of the recess in the head of the screw 1, and relative rotary motion between the tool and screw will cease, a large part of the torque being then transmitted by the co-operating surfaces. When the screw has been screwed into position the screw-driving tool may be removed from the screw by simply unscrewing it therefrom.

The screw-driving tool illustrated in Figure 4 is similar to that of Figure 3 except that the self-tapping thread is of a different form. In this case the tool has a shank 11 which is provided with an interrupted hard self-tapping thread 12 of a quick pitch but of the same general form as an ordinary thread cutting tap, i. e. with longitudinal grooves and sharp cutting edges adjacent to the grooves. Of course, the bore 3 need not be strictly cylindrical but may have a slight inward taper of, say, 13° and, of course, a tool for use in that case would have a slightly tapered shank to correspond.

In Figure 2 of the drawing a modified form of screw is shown which may be regarded as derived from the form of Figure 1 by merging the parts 2 and 3 of the recess into one another in a curve. Referring to Figure 2, a screw 13 is provided in its head portion with a flared recess 14. The recess has a peripheral truncated conical portion 15 and an inner portion bounded by a surface of revolution of an arc of a circle about the axis of the screw. At the base of the recess the tangent to the circular arc is parallel to the axis whilst at the outer end of the arc the tangent to the circular arc may make an angle of from 40° to 60° with the axis or an even greater angle (less than 90°).

By way of example the base of the recess may have a diameter of from ½ to ⅓ of that of the shank of the screw according to the size of screw and the recess may extend to a depth of about 0.05 inch below the junction of the head with the shank for screws having shank diameters of about 0.164 to 0.22 inch. For such screws the radius of curvature of the circular arc generating line of the recess may be, for example, 0.18 inch.

For use with a screw of this kind it is preferred to use a screw-driving tool of the form illustrated in Figure 5 as it may be found that the threaded shank 7 or 11 of the construction according to Figure 3 or 4 cannot sufficiently securely engage with the curved walls of the recess 14. In Figure 5 only the head 16 of the screw-driving tool is shown and it will be understood that this head may be secured to any convenient handle or to a mechanically or electrically operated tool. The head 16 has a nose or shank 17 of diameter increasing from the tip so as to merge into a base part 18. The shape of the nose or shank corresponds to that of the recess 14. The nose or shank 17 is provided with a hardened self-tapping thread 19 of quick pitch which extends to the base 18.

In use the nose or shank 17 can be inserted into the recess 14 with a push fit so as to attach the screw to the tool and then by manipulating the latter the screw can be screwed into position. In the course of the screwing operation the thread 19 cuts or bites into the metal of the screw and owing to the shape of the screw recess, screw-thread and tool head a combined helical coupling and gripping or clutch coupling action is obtained, with engagement over a large area and, over the peripheral portions, at a relatively great distance from the axis of the screw, and a very considerable torque can be transmitted with little axial pressure and little danger of binding when it is desired to remove the tool from the screw.

This form of screw and screw-driving tool has many advantages. Thus, for example, if screws of different sizes are made with recesses of different maximum diameters at the outer ends but with the same minimum diameter at the base and the same curvature, a single screw-driving tool may be made to fit several sizes of screw as is shown by Figure 6. In this figure, 20 represents the nose or shank of the tool. A part of a screw 21 is shown in full lines, and parts of larger screws are shown in dotted lines at 22 and 23. It will be seen that the screw-driving tool can engage with any one of the screws.

A further advantage of this form arises from the fact that the screws can be made very cheaply in spite of the unconventional form of the head. Referring to Figure 7, a piece of wire stock 24 may be upset in known manner per se by means of suitably shaped dies diagrammatically shown at 25, 26. The head with the recess can then be formed in a second drop forging operation by means of suitably shaped dies such as are diagrammatically shown at 27 and 28 in Figure 8.

Moreover, it will be observed that when any material resistance is encountered by the screw, the nose or shank engages almost immediately over its whole available surface so that undue wear on any particular part of the nose or shank or the thread thereon is avoided. Again, it will be seen that owing to the form of the shank or nose a very strong tool head is obtained which can be made stronger than the screw so that the risk of tool breakage is minimized.

Owing to the widely flared recess in the head of the screw there is practically no danger of the tool binding or becoming locked in the recess in the screw head.

It will be apparent that screw-driving tools according to the present invention may be provided with a left hand self-tapping screw-thread in which case they may serve as unscrewing tools or for screwing in left hand screws.

After being screwed into position the recess in the screw head can be closed by driving in a closure plug such as is shown at 29 in Figure 9. Owing to the shape of the recess the underside of the head 30 of the plug can be conical and the plug can lie flush with the edge of the screw head thereby presenting an extremely neat appearance. Such plugs, if made of synthetic resin can be made cheaply by injection moulding. Moreover, whilst they are securely retained in position in the screw head they can be removed without great difficulty if required especially from screws of the kind illustrated in Figure 2.

If desired, the recess in a screw when the latter is screwed into position may serve to receive the shank of a fitting or bracket, although, of course, in the case of the screws according to Figure 2, the bracket or fitting must be provided with a specially shaped and screw-threaded nose or shank to engage in the recess.

It is also to be observed that both the screws and screw-driving tools can be made of robust construction so that the former are not likely to be damaged if, as is commonly the practice, they are driven partly into the work with a hammer before the screw-driving tool is employed.

I claim:

1. A screw having an externally threaded shank and a head, the head having a smooth unthreaded axial recess, the inner part of which has sides which are substantially parallel to the axis, and constitutes a socket for receiving a self-tapping thread on a screw driving tool, and the outer end of which is formed to a wide angle taper and constitutes a non-binding friction clutch surface adapted to transmit substantial torque and endwise pressure.

2. A screw having an externally threaded shank and a head, the head having a smooth unthreaded axial recess, the inner part of which has sides which are substantially parallel to the screw axis, and constitutes a socket for receiving a self-tapping thread on a screw-driving tool, and the outer end of which is formed to a wide angle taper having a cone angle of from 140° to 160° to provide a non-binding friction clutch surface adapted to transmit substantial torque and endwise pressure.

3. A screw having an externally threaded shank and a head, the head having a smooth unthreaded axial recess, the inner part of which has sides which are substantially parallel to the screw axis, and constitutes a socket for receiving a self-tapping thread on a screw-driving tool, and the outer end of which is formed to provide a widely flared truncated conical portion having a cone angle of more than 90° constituting a non-binding friction clutch surface adapted to transmit substantial torque and endwise pressure.

GRANVILLE BRADSHAW.